_US007701813B2_

United States Patent
Miyagawa (10) Patent No.: US 7,701,813 B2
(45) Date of Patent: Apr. 20, 2010

(54) METHOD FOR RECORDING TO AND REPRODUCING FROM AN OPTICAL RECORDING MEDIUM, OPTICAL RECORDING MEDIUM, AND RECORDING AND REPRODUCTION APPARATUS FOR THE SAME

(75) Inventor: Naoyasu Miyagawa, Kawanishi (JP)

(73) Assignee: Panasonic Corporation, Osaka (JP)

( * ) Notice: Subject to any disclaimer, the term of this patent is extended or adjusted under 35 U.S.C. 154(b) by 1098 days.

(21) Appl. No.: 10/568,595

(22) PCT Filed: Jul. 8, 2005

(86) PCT No.: PCT/JP2005/012645

§ 371 (c)(1),
(2), (4) Date: Feb. 17, 2006

(87) PCT Pub. No.: WO2006/043356

PCT Pub. Date: Apr. 27, 2006

(65) Prior Publication Data

US 2008/0175138 A1      Jul. 24, 2008

(30) Foreign Application Priority Data

Oct. 19, 2004   (JP) .............................. 2004-304087

(51) Int. Cl.
    *G11B 7/00*   (2006.01)
(52) U.S. Cl. .................. 369/44.26; 369/47.55
(58) Field of Classification Search ........................ None
    See application file for complete search history.

(56) References Cited

U.S. PATENT DOCUMENTS 5,793,741 A  *  8/1998  Kashihara et al. ........ 369/275.4

5,892,740 A     4/1999   Nagasawa et al.
6,320,831 B1   11/2001   Inoue et al.
6,396,798 B1    5/2002   Takemura et al.

(Continued)

FOREIGN PATENT DOCUMENTS

EP           0 574 886           12/1993

(Continued)

OTHER PUBLICATIONS

Extended European Search Report issued Jul. 2, 2009 in corresponding EP Application Serial No. 05 76 5540.

*Primary Examiner*—Paul Huber
(74) *Attorney, Agent, or Firm*—Wenderoth, Lind & Ponack, L.L.P.

(57) ABSTRACT

A method for recording and reproducing information to/from with an optical recording medium, with which either in-groove recording or on-groove recording is selected according to a type of the recording medium, and information can be recorded and reproduced with good signal quality. In this method a laser beam is reflected by an information recording layer and is received by a photodetector that has been split into at least two parts by a split line parallel to the direction of the grooves. Further, the laser beam is reflected in a region in which a groove width is greater than a width between grooves, and the method determines whether the grooves on a side where the laser beam is incident are convex or concave based on a sum signal and a difference signal of photodetection signals outputted from the photodetector.

6 Claims, 7 Drawing Sheets

U.S. PATENT DOCUMENTS

2004/0109404 A1    6/2004    Hayashi

FOREIGN PATENT DOCUMENTS

| EP | 0 881 632 | 12/1998 |
| EP | 1 426 936 | 6/2004 |
| JP | 6-267081 | 9/1994 |
| JP | 8-45111 | 2/1996 |
| JP | 11-149650 | 6/1999 |
| JP | 2002-367185 | 12/2002 |
| WO | 99/26239 | 5/1999 |

* cited by examiner

(a) On-groove recording (b) In-groove recording

METHOD FOR RECORDING TO AND REPRODUCING FROM AN OPTICAL RECORDING MEDIUM, OPTICAL RECORDING MEDIUM, AND RECORDING AND REPRODUCTION APPARATUS FOR THE SAME

This application is a 371 of PCT/JP2005/012645, filed Jul. 8, 2005.

BACKGROUND OF THE INVENTION

1. Field of Invention

The present invention relates to a method for recording to and reproducing information from an optical recording medium comprising a recording layer that records and reproduces information by irradiation with a laser beam or the like, and to an optical recording medium and a recording and reproducing apparatus for the same.

2. Description of the Related Art

Optical recording media have garnered attention as high-volume and high-density storage devices, and come in a rewritable type that allows information to be rewritten, and a write-once type that allows information to be recorded only one time.

One such rewritable type of optical recording medium comprises a substrate over which is provided a recording layer consisting of a thin film that undergoes a phase change between amorphous and crystalline states, and information is recorded or reproduced with this medium by means of thermal energy produced by irradiation with a laser beam. Alloy films whose main component is germanium, antimony, tellurium, indium, or the like, such as a GeSbTe alloy, are known as phase-change materials that can be used for such recording layers. The recording of information is accomplished by forming marks by rendering parts of the recording layer amorphous, while the erasure of information is accomplished by crystallizing the amorphous marks. The recording layer can be amorphized by heating it to over its melting point and then cooling it at a certain rate or higher. Crystallization can be effected by heating the recording layer to over its crystallization temperature but under its melting point. Information is reproduced by utilizing the difference in reflectivity between these amorphous marks and the crystalline regions.

One write-once type of optical recording medium is a write-once type of recording medium in which an organic colorant film formed by spin coating is used as the recording layer. As the processing capability of various kinds of information device has risen in recent years, so too has the amount of information being handled, and less expensive recording media have come to be required. A write-once recording medium is an example of an inexpensive recording medium.

Figure 7:
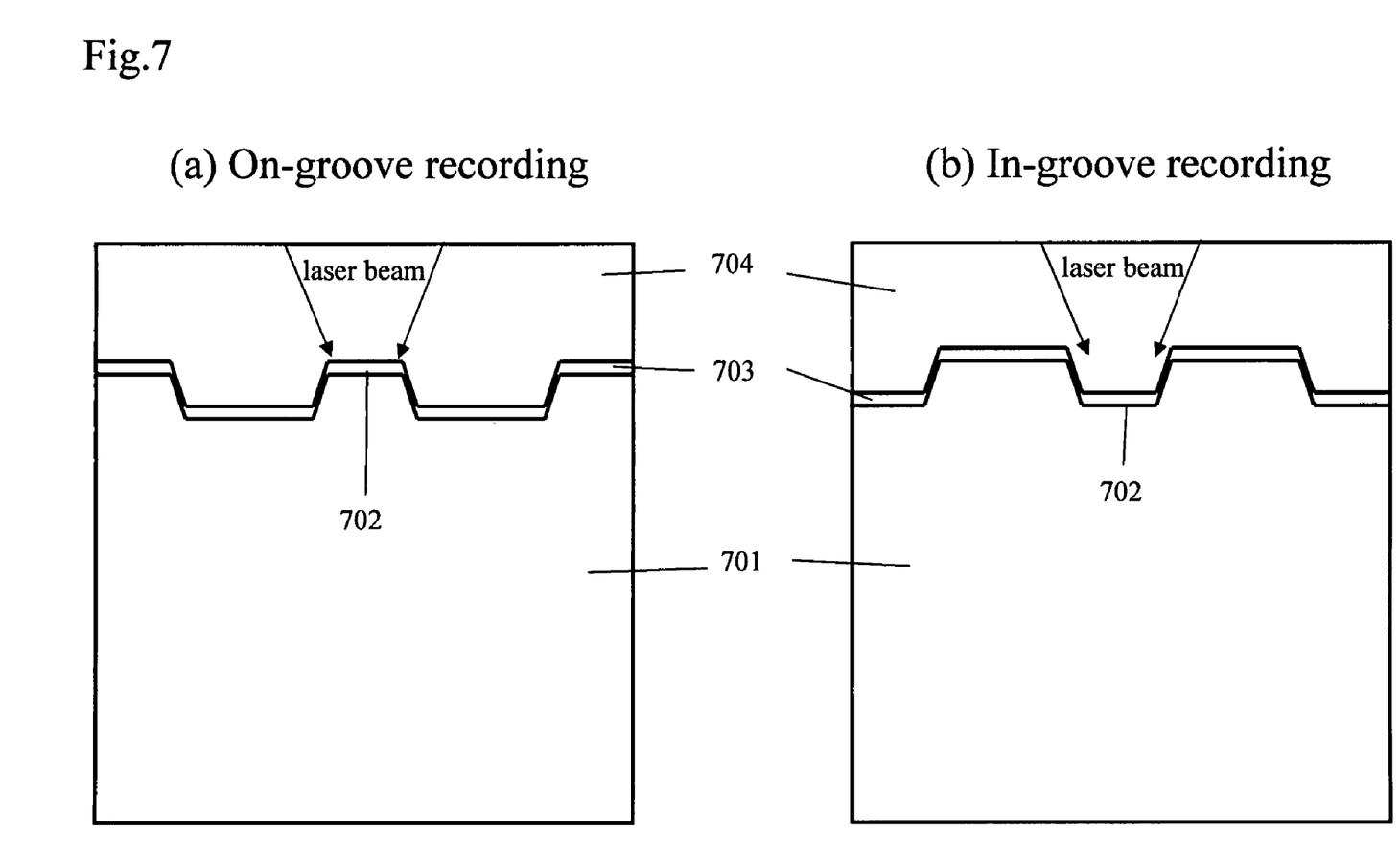
FIG. 7 is a schematic diagram of a disk cross section illustrating the differences between on-groove recording and in-groove recording.

Both types of mediums generally comprise a substrate provided with spiral or concentric circular grooves for tracking a laser beam during recording and reproduction. The regions between the grooves are called lands, and usually the grooves constitute information tracks and the lands serve as guard bands for separating adjacent information tracks. With a rewritable Blu-ray disc, for example, the grooves are convex on the side where the laser beam is incident, and information is recorded by irradiating these convex portions with a laser beam. This configuration is referred to as on-groove recording. This is distinguished from a configuration in which information is recorded in grooves that are concave on the side where the laser beam is incident, and this is referred to as in-groove recording. FIG. 7 is a schematic diagram of a conventional disk cross section, illustrating the differences between on-groove recording and in-groove recording. FIG. 7a shows on-groove recording, and FIG. 7b shows in-groove recording. Grooves 702 are formed in a substrate 701. An information recording layer 703 is formed over the substrate 701, and a cover layer 704 with optical transparency is formed over this. A laser beam for recording and reproducing information is incident from the transparent layer side, and is focused on the groove 702 portion of the information recording layer 703. The grooves 702 are convex on the laser incident side in FIG. 7a, and are concave in FIG. 7b.

BRIEF SUMMARY OF THE INVENTION

Figure 4:
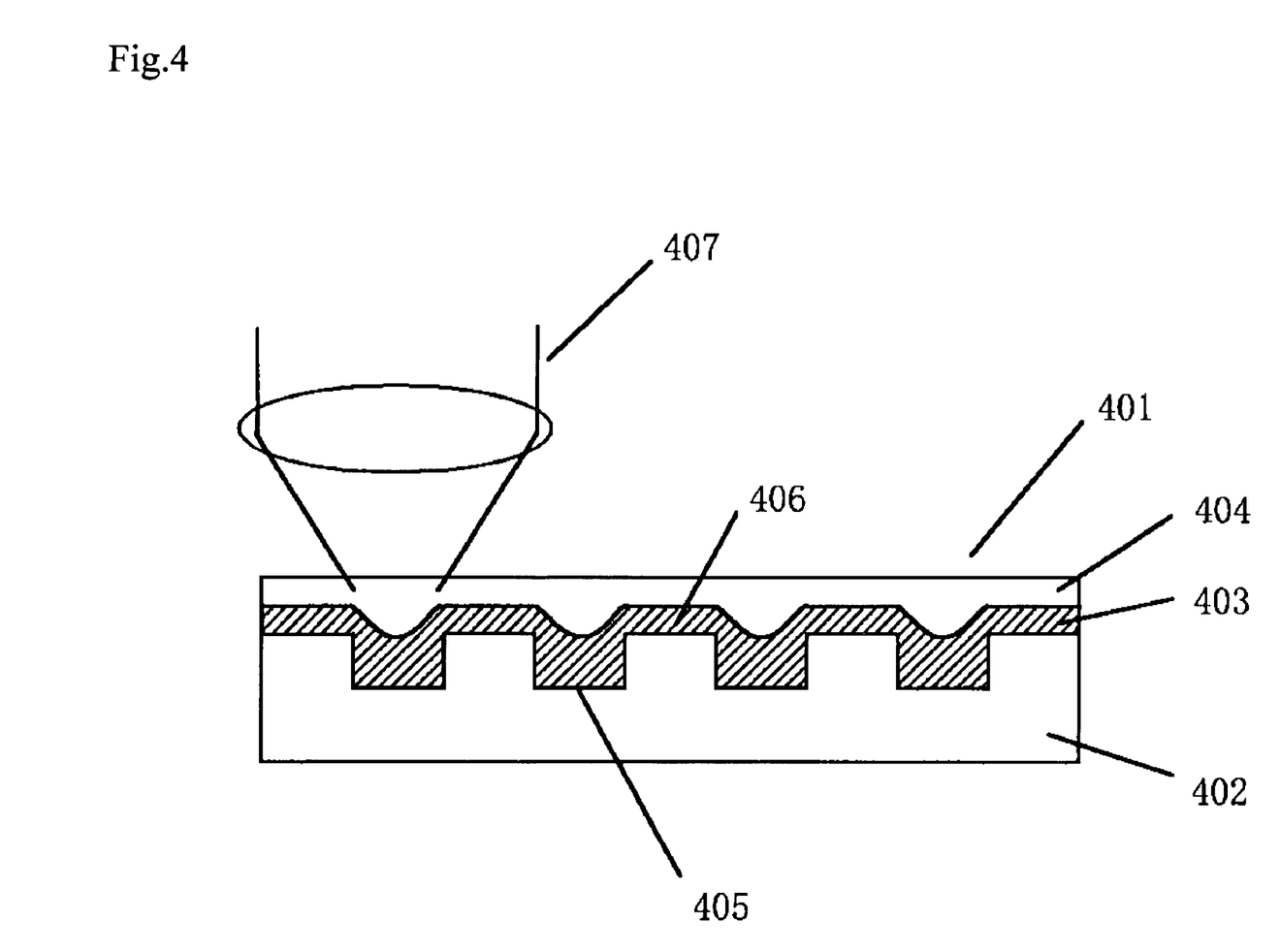
FIG. 4 is a cross section of a conventional optical recording medium.

FIG. 4 is a cross section of the main components of a write-once type of recording medium, taken in the radial direction. In FIG. 4, a recording medium 401 is produced by coating a substrate 402, with a thickness of 1.1 mm and equipped with information tracks, with an organic colorant by spin coating, thereby forming a recording layer 403, over which a transparent cover layer 404 is formed in a thickness of 0.1 mm. This is irradiated with a laser beam 407 through the cover layer 404 to record and reproduce information.

However, the concave and convex information tracks that make up the recording layer 403 formed by spin coating are thicker in a concave region 405 and thinner in a convex region 406, so suitable signal quality is not obtained with the same on-groove recording as with the rewritable Blu-ray disc discussed above. In-groove recording is therefore considered more suitable in this case. However, since the tracking characteristics are not known, whether the recording type is in-groove or on-groove must be determined by trial and error approach, in which the type is guessed to be one or the other and tracking control is performed. The problem with this trial and error approach, however, is that start-up takes correspondingly longer.

It is an object of the present invention to provide a method for recording information to and reproducing information from an optical recording medium with which information can be recorded and reproduced with good signal quality and either in-groove recording or on-groove recording can be selected according to the type of recording medium in question.

To solve the above problems, the present invention is a method for recording and reproducing information to/from an optical recording medium by directing a laser beam at an optical recording medium having spiral or concentric circular grooves for tracking a laser beam and provided with one or more information recording layers. This method includes directing the laser beam at the grooves formed in an identification region of the optical recording medium, directing the laser beam at the grooves formed in an information recording region of the optical recording medium, controlling the focal point of the laser beam to focus on the information recording layer, receiving the laser beam reflected by the information recording layer with a photodetector that is split into at least two parts by a split line parallel to the direction of the grooves, determining whether the grooves on the side where the laser beam is incident are convex or concave on the basis of a sum signal and difference signal of the photodetection signals outputted from the split photodetector, and subjecting the grooves to tracking control on the basis of the result of the above determining of whether the grooves are concave or convex.

By thus determining whether the grooves of an optical recording medium with which recording and reproduction are to be performed are convex or concave on the side where the laser beam is incident, it is possible to record and reproduce information with good signal quality by selecting either in-groove recording or on-groove recording.

With the above recording and reproduction method, it is preferable if a spot diameter of the laser beam directed at the information recording layer is set larger than the width of the grooves formed in the identification region.

This makes it possible to record and reproduce information with good signal quality by selecting either in-groove recording or on-groove recording.

The above recording and reproduction method is characterized in that the step of controlling the focal point of the laser beam is performed on at least one information recording layer.

The information recording layer on which the laser beam is focused may, for example, be the farthest information recording layer from the laser beam incident side.

This makes it possible to record and reproduce information with good signal quality by selecting either in-groove recording or on-groove recording.

The above recording and reproduction method is characterized by further comprising determining whether the grooves of the information recording layer not subjected to the controlling the focal point of the laser beam are convex or concave on the basis of recording track information stored in a control information region of the optical recording medium. The recording track information includes, for example, information indicating whether the grooves in all the information recording layers are convex or concave on the side where the laser beam is incident.

Here, the control information region may be a dedicated reproduction region, for example, in which the recording track information for all the information recording layers is recorded. Or, the control information region may be provided to the information recording layer that is farthest from the side where the laser beam is incident, out of the plurality of information recording layers. This allows the recording track information of the rest of the layers to be obtained merely by determining whether in-groove recording or on-groove recording is applicable with a single information recording layer. Thus, start-up time can be reduced.

Also, with the above recording and reproduction method, it is preferable if the recording or reproduction of information is performed using an optical recording medium in which information signals have not been recorded in the grooves formed in the identification region.

The present invention is an optical recording medium having spiral or concentric circular grooves for tracking a laser beam and provided with an information recording layer, having at least an identification region and an information recording region, wherein the track pitch Tp2 of the grooves formed in the identification region is larger than the track pitch Tp1 of the grooves formed in the information recording region, and the width of the grooves formed in the identification region is less than the width between the grooves.

Alternatively, the present invention is an optical recording medium having spiral or concentric circular grooves for tracking a laser beam and provided with an information recording layer, having an identification region and an information recording region in at least one information recording layer, wherein the track pitch Tp2 of the grooves formed in the identification region is larger than the track pitch Tp1 of the grooves formed in the information recording region, and the width of the grooves formed in the identification region is less than the width between the grooves.

This makes it possible to record and reproduce information with good signal quality.

The above-mentioned optical recording medium is characterized in that the width of the grooves formed in the identification region is substantially equal to the width of the grooves formed in the information recording region.

This makes it possible to record and reproduce information with good signal quality.

It is preferable if the above-mentioned optical recording medium further has a control information region, wherein recording track information is stored in the control information region.

This allows the recording track information of the rest of the layers to be obtained merely by determining whether in-groove recording or on-groove recording is applicable with a single information recording layer.

The present invention is also a recording and reproduction apparatus that records and reproduces information by directing a laser beam at an optical recording medium having spiral or concentric circular grooves for tracking a laser beam and provided with one or more information recording layers, comprising an irradiation unit for directing the laser beam at the optical recording medium, a light receiving unit for receiving the laser beam reflected by the information recording layer by means of a photodetector that is split into at least two parts by a split line parallel to the direction of the grooves, and a control unit for determining whether the grooves on the side where the laser beam is incident are convex or concave on the basis of a sum signal and difference signal of the photo-detection signals outputted from the split photodetector, and subjecting the grooves to tracking control on the basis of the determination result.

With the above-mentioned recording and reproduction apparatus, it is preferable if the spot diameter of the laser beam directed at the information recording layer is larger than the width of the grooves formed in the identification region.

With the above, information can be recorded and reproduced with good signal quality by selecting either in-groove recording or on-groove recording by determining whether the grooves of an optical recording medium with which recording and reproduction are to be performed are convex or concave on the side where the laser beam is incident.

According to the method for recording and reproducing with an optical recording medium of the present invention, either in-groove recording or on-groove recording suitable for information recording is selected according to the type of recording medium, and information can be recorded and reproduced with good signal quality.

DETAILED DESCRIPTION OF THE INVENTION

The method for recording to and reproducing from an optical recording medium of the present invention will now be described through reference to the drawings.

Embodiment 1

Figure 1:
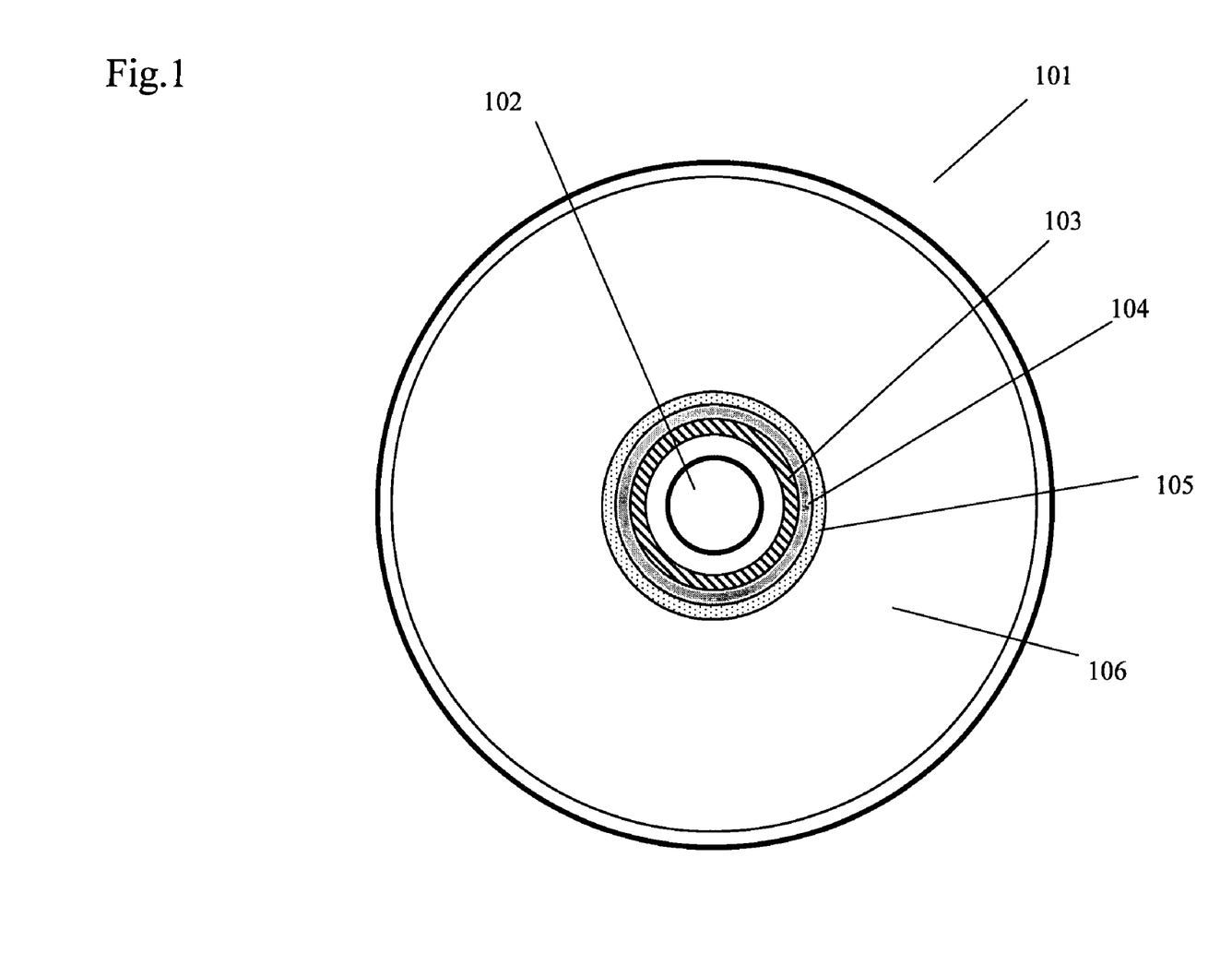
FIG. 1 is a plan view of an optical recording medium used in the recording and reproduction method in Embodiment 1 of the present invention.

FIG. 1 is a plan view of an optical recording medium used in the recording and reproduction method in Embodiment 1 of the present invention. The recording medium in this Embodiment 1 is an optical disk with which information is recorded or reproduced by irradiating with a laser beam whose wavelength λ is approximately 405 nm and which has been condensed mainly by an objective lens whose NA is approximately 0.85.

In FIG. 1, an optical disk 101 has a structure in which a recording layer is provided over a transparent substrate with a diameter of 120 mm and a thickness of 1.1 mm, composed of a polycarbonate, and equipped with a center hole 102 having a diameter of 15 mm, which is used to mount the disk in a recording and reproduction apparatus, and a protective layer with a thickness of 0.1 mm is provided over this. The disk is irradiated with a laser beam through the protective layer to record and reproduce information. The recording layer is composed of an organic colorant or a GeSbTe alloy, which is a phase-changing recording material, and forms recording marks upon being irradiated with the laser beam.

The optical disk 101 includes: an identification region 103 that is provided at a radial position of from approximately 21 mm to approximately 22 mm and in which grooves are formed at a track pitch Tp2 of 2 μm; a reproduction-only control information region 104 provided at a radial position of from approximately 22 mm to approximately 23 mm; a test recording region 105 provided at a radial position of from approximately 23 mm to approximately 24 mm, for performing a learning operation to find the optimal pulse conditions; and an information recording region 106 provided at a radial position of from approximately 24 mm to approximately 58 mm, in which information is recorded. The test recording region 105 and information recording region 106 are made up of grooves with a track pitch Tp1 of approximately 0.32 μm. The width of the grooves in the identification region 103, the test recording region 105, and the information recording region 106 is approximately 0.2 μm in every case. In the control information region 104, grooves with a track pitch of approximately 0.35 μm are wobbled in the radial direction, and the spatial frequency thereof is modulated to record reproduction-only information. This region includes information that is important for the spatial frequency of the wobbling of the grooves, so the track pitch is set higher than that in the information recording region 106 in an effort to reduce cross-talk with adjacent tracks and improve the reliability of the information being reproduced. The grooves in the test recording region 105 and information recording region 106 are also wobbled radially according to a specific frequency modulation, thereby recording address information, and are also used to control the rotation of the spindle motor of the recording and reproduction apparatus on the basis of signals obtained from this wobble.

Figure 2:
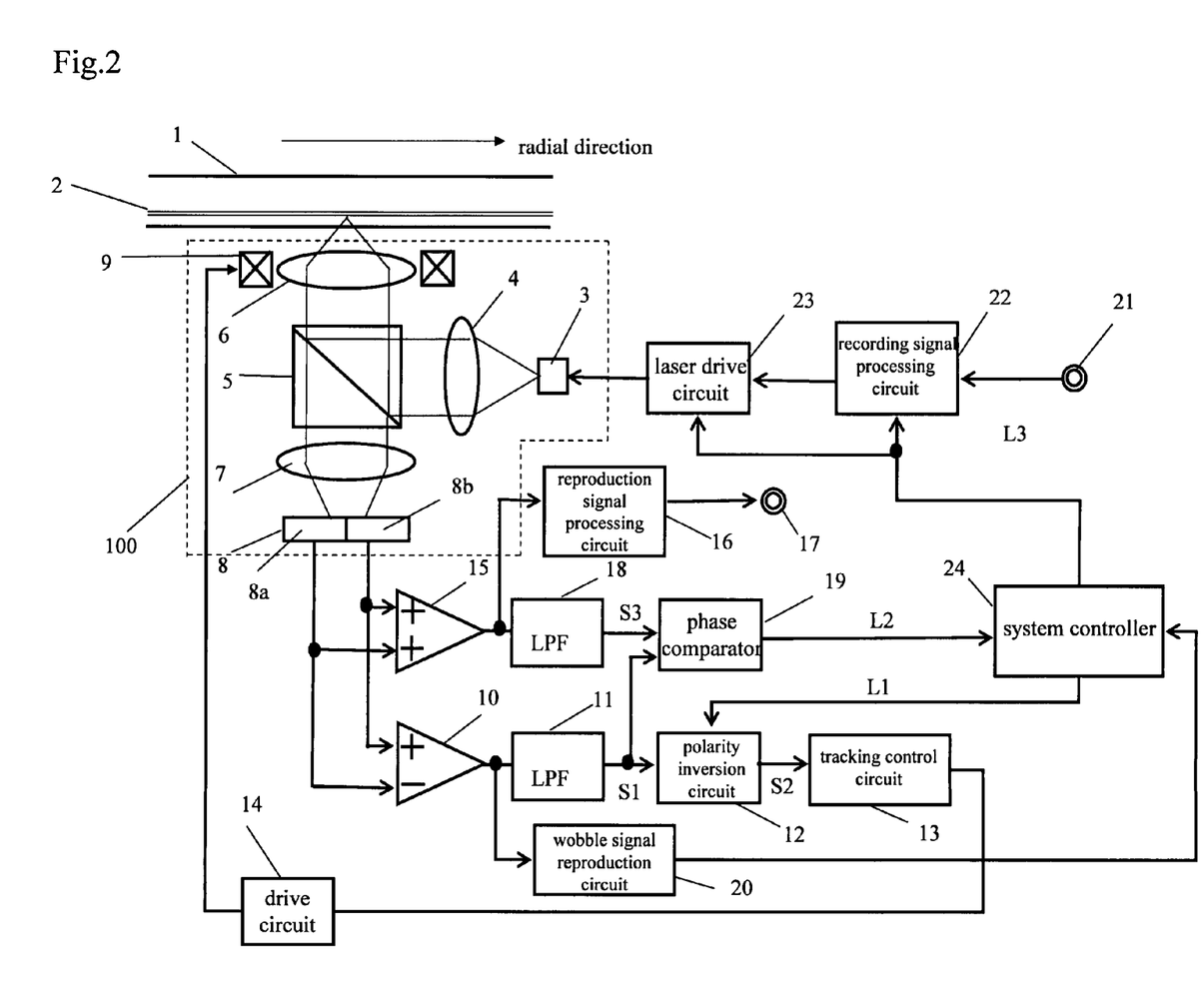
FIG. 2 is a block diagram of the structure of a recording and reproduction apparatus that employs the recording and reproduction method in Embodiment 1 of the present invention.

FIG. 2 is a block diagram of a recording and reproduction apparatus that is a specific embodiment of the method for recording to and reproducing from an optical recording medium in this embodiment.

1 is the optical disk described for FIG. 1, and 2 is the information recording layer of the optical disk 1. 3 is a semiconductor laser, 4 is a collimator lens for converting the laser beam emitted from the semiconductor laser 3 into parallel light, 5 is a half-mirror provided over the parallel light flux, and 6 is an objective lens for condensing the parallel light reflected by the half-mirror 5 onto the information side of the optical disk 1. 7 is a detecting lens that changes the light that has been reflected by the optical disk 1 and has gone through the objective lens 6 and the half-mirror 5 into focused light of a suitable spot diameter, and 8 is a photodetector for receiving this focused light. The photodetector 8 is split into two parts parallel to the information track direction, and is equipped with two light receiving units 8a and 8b. 9 is an actuator that supports the objective lens 6 and moves the objective lens 6 in the disk radial direction and the optical axis direction. The semiconductor laser 3, the collimator lens 4, the half-mirror 5, the objective lens 6, the detecting lens 7, the photodetector 8, and the actuator 9 are attached to a head base (not shown) to constitute an optical head 100. The optical head 100 is attached to a traverse motor (not shown), and is able to move in the radial direction of the optical disk 1 at the direction of control signals from a system controller 24 (discussed below).

10 is a differential amplifier to which the detection signals outputted by the light receiving units 8a and 8b are input, and outputs a difference signal. 11 is a low-pass filter (hereinafter abbreviated as LPF) to which the difference signal outputted by the differential amplifier 10 are input, and outputs a signal S1 to a polarity inversion circuit 12 (discussed below). 12 is this polarity inversion circuit to which the signal S1 outputted by the LPF 11 and a control signal L1 outputted by the system controller 24 (discussed below) are input, and outputs a signal S2 to a tracking control circuit 13 (discussed below). 13 is this tracking control circuit to which the signal S2 outputted by the polarity inversion circuit 12 is input, and outputs a tracking control signal to a drive circuit 14 (discussed below). 14 is this drive circuit to which a tracking control signal from the tracking control circuit 13 is input, and outputs drive current to the actuator 9.

15 is an addition amplifier to which the detection signals outputted by the light receiving units 8a and 8b of the photodetector 8 are input, and outputs a sum signal. 16 is a reproduction signal processing circuit that reproduces information signals recorded to the optical disk 1 from the sum signal, performs processing such as demodulation and error correction, and outputs the result as digital video and audio data or computer data to an external output terminal 17.

18 is an LPF to which the sum signal outputted by the addition amplifier 15 is input, and outputs a signal S3 to a phase comparator 19 (discussed below). 19 is this phase comparator to which the signals S1 and S3 are input, and outputs a track identification signal L2 to the system controller 24 (discussed below). 20 is a wobble signal reproduction circuit to which a difference signal from the differential amplifier 10 is input, reproduces control information, address information, or the like recorded by the wobbling of the grooves in the optical disk 1, and outputs the result to the system controller 24 (discussed below).

22 is a recording signal processing circuit to which information signals such as video and audio data or computer data from an external input terminal 21, and a control signal L3 outputted by the system controller 24 are input, and outputs recording data to a laser drive circuit 23 (discussed below). 23 is this laser drive circuit to which the control signal L3 outputted by the system controller 24, and recording data outputted by the recording signal processing circuit 22 are input, and outputs drive current to the semiconductor laser 3.

24 is a system controller, which outputs control signals L1 and L3 to the polarity inversion circuit 12, the recording signal processing circuit 22, and the laser drive circuit 23, and to which control information and address data from the wobble signal reproduction circuit 20 are input.

The operation of the recording and reproduction apparatus constituted as above will be described by going back to FIG. 1.

First, the operation when an information signal is being reproduced will be described. First, the spindle motor (not shown) rotates the optical disk 1 at a constant angular or linear velocity. The system controller 24 outputs a control signal to the traverse motor, which moves the optical head over the identification region 103 of the optical disk 1, and then outputs the control signal L4 to the laser drive circuit 23. The laser drive circuit 23 goes into reproduction mode and outputs drive current to the semiconductor laser 3 to emits light at a constant intensity that is low enough not to cause any change in the information recording layer 2.

Next, position control is performed in the focal direction of the laser beam. It is assumed here that standard focus control (such as for astigmatism) has been carried out, and this process will not be described here.

After the laser beam has been focused on the identification region 103 of the information recording layer 2, the laser beam emitted from the semiconductor laser 3 is converted into parallel light by the collimator lens 4 and is focused on the optical disk 1 by the objective lens 6 via the half-mirror 5. The light beam reflected by the optical disk 1 is imparted with the information on the information track by diffraction (the distribution of the amount of reflected light), after which the beam is guided to the photodetector 8 via the objective lens 6, the half-mirror 5, and the detecting lens 7. The light receiving units 8a and 8b of the photodetector 8 convert the change in the distribution of the amount of light in the incident light beam into an electrical signal, and output the result to the differential amplifier 10 and the addition amplifier 15. The differential amplifier 10 converts the input currents into voltages, then takes a differential and outputs it as a difference signal to the LPF 11. The LPF 11 extracts the low frequency component from this difference signal, and outputs it as the signal S1 to the polarity inversion circuit 12 and the phase comparator 19. Meanwhile, the addition amplifier 15 converts the input currents from the light receiving units 8a and 8b into voltages, and then adds the two together and outputs the result as a sum signal to the LPF 18 and the reproduction signal processing circuit 16. The LPF 18 extracts the low frequency component from this sum signal, and outputs it as the signal S3 to the phase comparator 19. The phase comparator 19 compares the phases of the signal S2 and the signal S3, and outputs the track identification signal L2 to the system controller 24 according to the result of this comparison. The system controller 24 determines from the track identification signal L2 whether the optical disk 1 is an in-groove recording type or an on-groove recording type, and outputs the control signal L1 to the polarity inversion circuit 12 according to the result. The polarity inversion circuit 12 either allows the signal S1 to pass through unchanged, or inverts the positive or negative polarity of the signal S1, according to the control signal L1 inputted from the system controller 24, and outputs this result as the signal S2 to the tracking control circuit 13. The signal S2 is what is known as a push-pull signal, and corresponds to the tracking difference between the information track and the beam spot focused on the information recording layer 2 of the optical disk 1. Here, the signal S1 is allowed to pass through if the optical disk 1 is an in-groove recording type, but the positive or negative polarity of the signal S1 is inverted if the optical disk 1 is an on-groove recording type.

Next, the system controller 24 outputs a control signal to the traverse motor, which moves the beam spot to the control information region 104 or the information recording region 106. When this movement is complete, the tracking control circuit 13 outputs a tracking control signal to the drive circuit 14 according to the level of the inputted signal S2. The drive circuit 14 outputs drive current to the actuator 9 according to this tracking control signal, and moves the position of the objective lens 6 in the direction crossed by the information track. This allows the beam spot to accurately scan the information track.

The reason this recording and reproduction apparatus is able to distinguish between in-groove recording and on-groove recording will now be explained.

Figure 3:
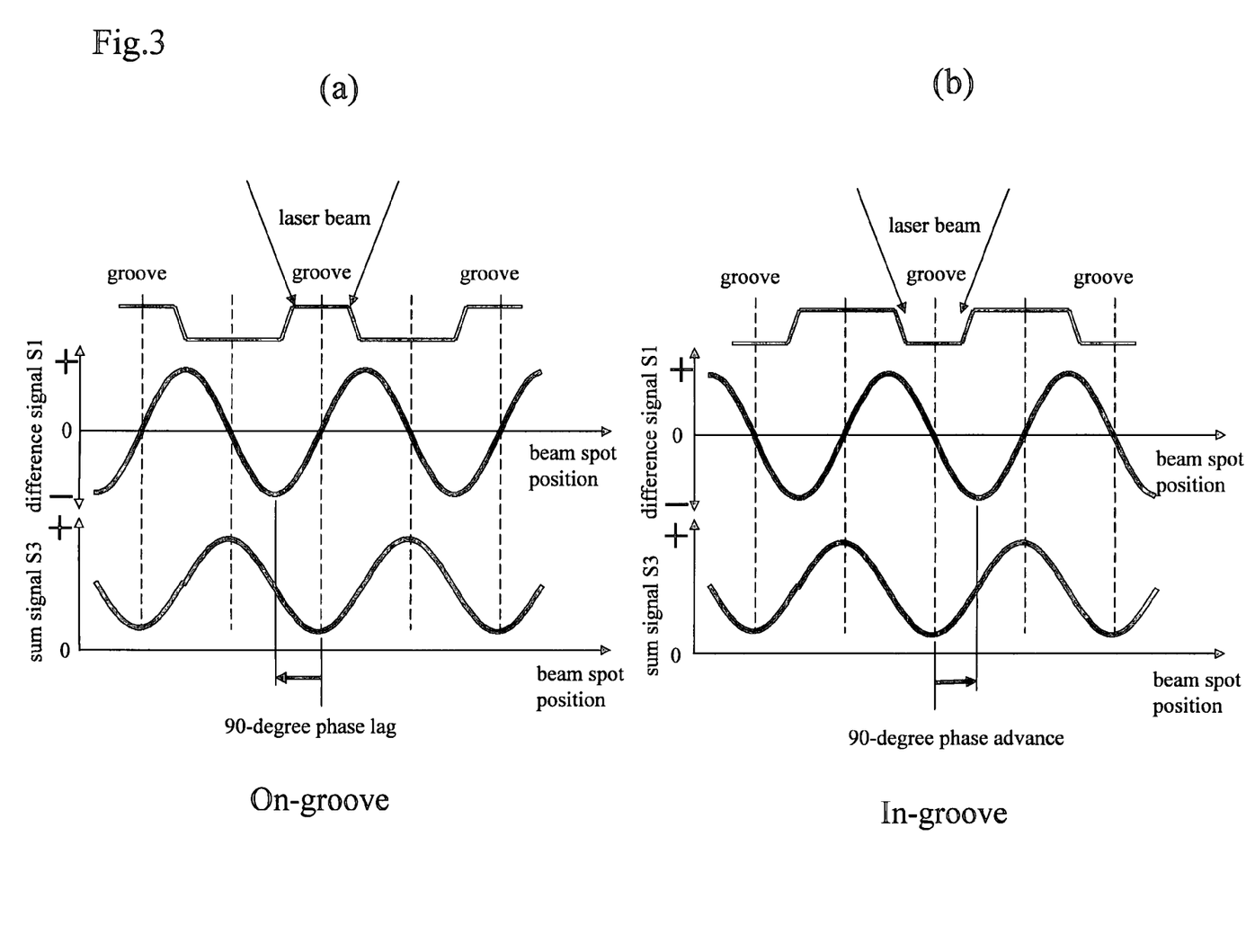
FIG. 3 is a waveform diagram of a difference signal S1 and a sum signal S3.

FIG. 3 consists of waveform diagrams of the difference signal S1 and the sum signal S3 when the laser beam spot is moved over the information recording layer in a direction crossing the grooves. FIG. 3a illustrates on-groove recording, and FIG. 3b in-groove recording. The upper waveforms are of the difference signal S1, and the lower waveforms are of the sum signal S3.

When the actuator 9 or the traverse motor moves the beam spot in a direction crossing the grooves at the command of the control signal from the system controller 24, the difference signal S1 has its zero point in the center of the grooves or in the center between the grooves (center of the lands), and the positive or negative value is at its minimum between the grooves and lands. Whether the slope of S1 in the groove center is positive or negative is determined by the polarity of the differential amplifier and by whether the grooves are convex or concave on the side where the laser is incident. Here, we will assume that the grooves are convex on the side where the laser is incident, that is, that the slop during on-groove recording is positive.

Meanwhile, when the beam spot comes over the groove, the sum signal S3 is at its minimum value, regardless of on-groove or in-groove recording. This is because while the groove pitch is 2 μm in the identification region of the optical disk 1, the width of the grooves is only about 0.2 μm, while the width between the grooves is about 1.8 μm. In contrast, the diameter φ of the beam spot is as shown below.

$$\phi = 0.6\lambda/NA = 0.29 \text{ μm} \quad \text{(Formula 1)}$$

Thus, when the beam spot is between grooves, the laser beam is reflected directly, but when the spot is over a groove, it is diffracted by the groove, and the amount of laser beam returning to the photodetector 8 drops to the minimum. Thus, by detecting whether the slope of the difference signal S1 is positive or negative when the sum signal S3 is at its minimum when the beam spot has been moved, it is possible to determine whether the recording is on-groove or in-groove. To make this determination possible, the speed at which the objective lens 6 is moved is suitably decided by taking into account the rotational speed of the disk and the amount of eccentricity of the information track so that the relative speed between the beam spot and the grooves will remain substantially constant.

In general, to maximize the recording capacity of a disk in the information recording region, the track pitch Tp1 is set to the smallest value at which cross-talk with adjacent tracks will not occur. Accordingly, the track pitch Tp1 in the information recording region is slightly wider than the beam spot diameter 4. However, the grooves may be either wider or narrower than the lands, depending on the recording material, making it impossible to distinguish between in-groove recording and on-groove recording. Meanwhile, since the track pitch Tp2 can be freely set in the identification region, the groove width is set to be the same as in the information recording region 106, and the width of the land portion set to be greater than the groove width, and preferably wider than the beam spot diameter φ. This result in the sum signal S3 always being at its minimum over a groove, so it is possible to distinguish between in-groove recording and on-groove recording.

When the beam spot is accurately positioned over the information track, the wobble signal reproduction circuit 20 converts the difference signal outputted from the differential amplifier 10 into control information in the control information region 104, and into address information in the test recording region 105 or the information recording region 106, and outputs this result to the system controller 24. The system controller 24 controls the various elements in the apparatus so that subsequent reproduction or recording operations can be carried out smoothly utilizing control information or address information.

Next, the reproduction signal processing circuit 16 reproduces the information signal recorded to the optical disk 1 from the inputted sum signal, performs processing such as demodulation and error correction, and outputs the result as digital video and audio data or computer data to the external output terminal 17.

During recording, on the other hand, the system controller 24 outputs the control signal L3 to advise the recording signal processing circuit 22 and the laser drive circuit 23 that the system is in recording mode. The recording signal processing circuit 22 adds error correction code or the like to the digitized video and audio data, computer data, or the like inputted from the external input terminal 21, and then performs modulation for synchronizing reproduction, and outputs the result as modulated recording data to the laser drive circuit 23. When the system has been put in recording mode by the control signal L3, the laser drive circuit 23 modulates the drive current applied to the semiconductor laser 3 according to the recording data. As a result, the intensity of the beam spot directed at the optical disk 1 changes according to the recording signal, and recording marks are formed on the information recording layer 2.

Because of the above constitution, with the recording and reproduction method of the present invention it is possible to record and reproduce information at good signal quality, regardless of the type of optical disk, by determining whether the recording is in-groove or on-groove at the start of use of the optical disk 101, and selecting the polarity of tracking with the polarity inversion circuit. Thus, it is possible to use optical disks made from recording materials that only give good characteristics in in-groove recording, such as organic colorant-based recording materials formed by spin coating. Furthermore, since this determination can be performed before tracking control is applied, it takes less start-up time until the start of recording or reproduction, which makes the recording and reproduction apparatus more convenient to use. For instance, since it is impossible to distinguish between in-groove recording and on-groove recording when this embodiment is not employed, tracking control can only be applied by trial and error, by guessing that it is on-groove recording, for example. If the address can be read, it is concluded that the guess was correct, but otherwise it is assumed that in-groove recording is applicable, and tracking control has to be applied again to make a determination, which means that start-up takes two to three seconds longer. With the method of this embodiment, though, it can be determined whether the recording is in-groove or on-groove recording in about one second.

Embodiment 2

Figure 5:
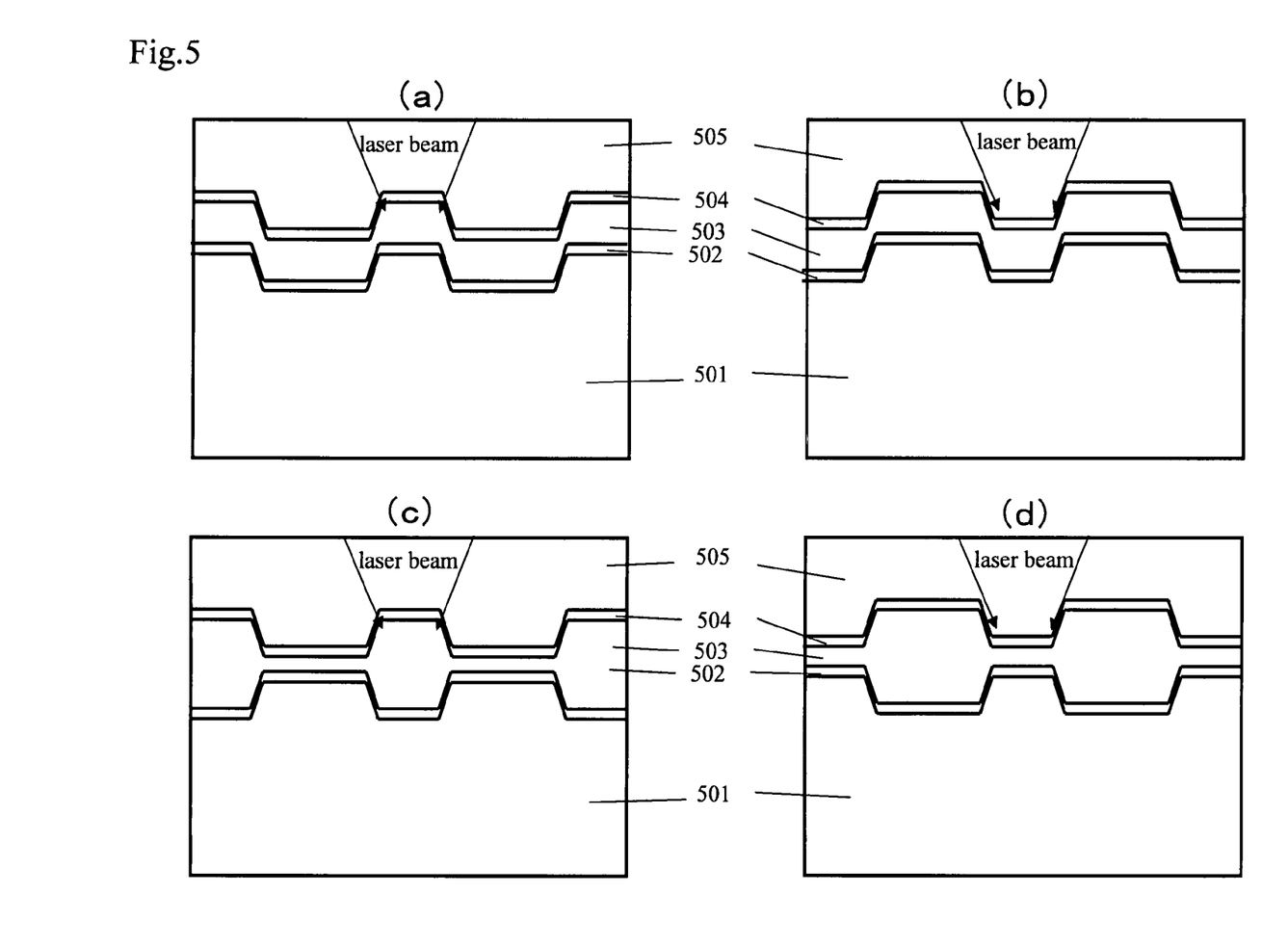
FIG. 5 is a schematic diagram of the cross section of an optical recording medium used in the recording and reproduction method in Embodiment 2 of the present invention.

FIG. 5 is a schematic diagram of the cross section of an optical recording medium used in the recording and reproduction method in Embodiment 2 of the present invention. In FIG. 5a, the optical recording medium in this embodiment has a configuration of two layers on one side, comprising two information recording layers 502 and 504. The laser beam is incident from a transparent cover layer 505 side, and is focused selectively on the first information recording layer 502 or the second information recording layer 504, thereby recording or reproducing information to or from the two information recording layers from the same side. The information recording layers 502 and 504 are separated from one another by a spacer layer 503 that is approximately 0.025 mm thick, and these layers 502, 503, and 504 are sandwiched between a substrate 501 that is 120 mm in diameter and 1.1 mm thick and the cover layer 505 that is 0.075 mm thick. The two information recording layers 502 and 504 are both designed for on-groove recording.

FIGS. 5b, 5c, and 5d are illustrations of optical recording media used in the recording and reproduction method of this embodiment, and while the constituent elements are the same as in FIG. 5a, the two information recording layers 502 and 504 are respectively (b) in-groove and in-groove, (c) in-groove and on-groove, and (d) on-groove and in-groove.

With the optical recording medium of this embodiment, at least the first information recording layer 502 has the same configuration as in Embodiment 1 shown in FIG. 1, comprising the identification region 103, the control information region 104, the test recording region 105, and the information recording region 106. Furthermore, recording track information indicating whether the two information recording layers of this optical recording medium are for in-groove recording or on-groove recording is recorded in the control information region 104 as part of the control information.

When information is reproduced from the optical recording medium, first, the laser beam is focused on the identification region 103 of the first information recording layer 502, and it is determined whether the recording is in-groove or on-groove recording by the method described in Embodiment 1. After this determination, the laser beam is moved to the control information region 104, tracking control is applied to the grooves, and control information is reproduced.

Since the recording track information of the second information recording layer 504 is included in the control information, accurate tracking control is possible even without performing any identification of the second information recording layer 504 by comparison of the difference signal and sum signal in the identification region.

When there are two or more information recording layers as in this embodiment, with a multilayer recording medium that records and reproduces information to and from the recording layers from just one side, if either in-groove recording or on-groove recording is selected for each of the information recording layers, it will be possible to use a recording layer material suited to each information recording layer, such as combining a rewritable recording layer and a write-once recording layer, and the effect of the present invention will be more pronounced than when there is just one recording layer. In particular, with this embodiment, the first information recording layer shown in FIG. 5c may be used for in-groove recording, and the second information recording layer for on-groove recording, and a colorant-based material may be used for the recording material of the first information recording layer, and an inorganic material for the second information recording layer. Here again, with the recording and reproduction method of this embodiment, the tracking polarity can be quickly identified, so start-up time can be shortened. Furthermore, an inexpensive colorant-based recording material can be used for the first information recording layer, and an inorganic recording material that should provide a high transmissivity can be used for the second layer, thereby striking a good balance between cost and performance with a two-layer disk.

Since the recording track information of all the information recording layers was recorded in the control information region, the recording track information of the remaining layers can be obtained merely by determining whether a single information recording layer is set up for in-groove recording or on-groove recording. This affords a shorter start-up time.

The identification region may be provided to just the first information recording layer, but may instead be provided to both of the information recording layers. Also, there may be three or more recording layers.

Embodiment 3

Figure 6:
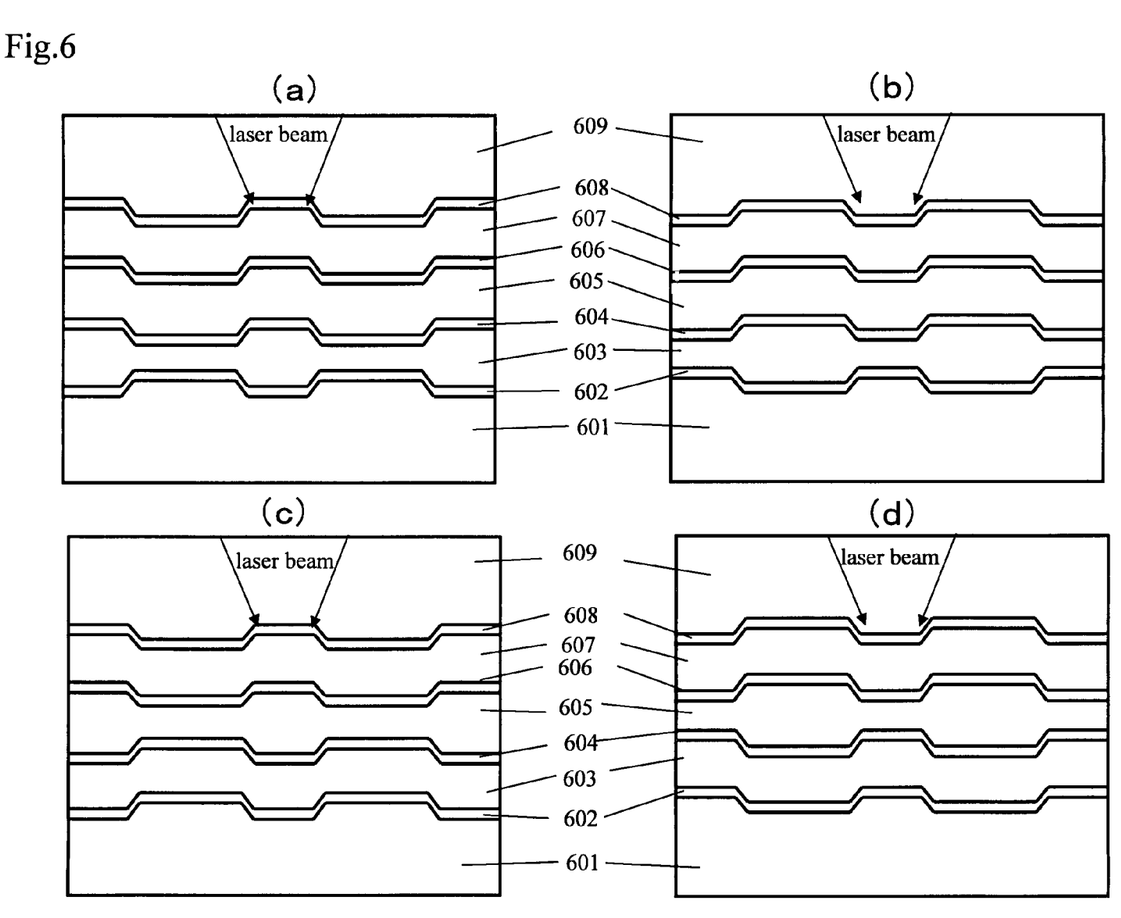
FIG. 6 is a schematic diagram of the cross section of an optical recording medium used in the recording and reproduction method in Embodiment 3 of the present invention.

FIG. 6 is a schematic diagram of the cross section of an optical recording medium used in the recording and reproduction method in Embodiment 3 of the present invention. In FIG. 6a, the optical recording medium in this embodiment has a configuration of four layers on one side, comprising four information recording layers 602, 604, 606, and 608. The laser beam is incident from a transparent cover layer 609 side, and is focused selectively on the first information recording layer 602, the second information recording layer 604, the third information recording layer 606, or the fourth information recording layer 608, thereby recording or reproducing information to or from the four information recording layers from the same side. The information recording layers 602 to 608 are separated from one another by spacer layers 603, 605, and 607, and all these layers 602 to 608 are sandwiched between a substrate 601 that is 120 mm in diameter and 1.1 mm thick and the cover layer 609. The first information recording layer 602 is set up for in-groove recording, and the second, third, and fourth information recording layers for on-groove recording. FIGS. 6b, 6c, and 6d are illustrations of optical recording media used in the recording and reproduction method of this embodiment, and while the constituent elements are the same as in FIG. 6a, the four information recording layers 602, 604, 606, and 608 are respectively (b) on-groove/in-groove/in-groove/in-groove, (c) in-groove/in-groove/on-groove/on-groove, and (d) on-groove/on-groove/in-groove/in-groove. The cover layer and intermediate layers can have any of various thicknesses, but in this embodiment, the thickness is 40/15/25/20 µm, starting from the cover layer side, and adds up to 100 µm. Since the distance from the surface of the cover layer to the first information recording layer is 100 µm, this is the same distance as the first information recording layer in Embodiments 1 and 2.

With the optical recording medium of this embodiment, at least the first information recording layer 602 has the same configuration as in Embodiment 1 shown in FIG. 1, comprising the identification region 103, the control information region 104, the test recording region 105, and the information recording region 106. Furthermore, recording track information indicating whether the four information recording layers of this optical recording medium are for in-groove recording or on-groove recording is recorded in the control information region 104 as part of the control information.

When information is reproduced from the optical recording medium, first the laser beam is focused on the identification region 103 of the first information recording layer 602, and it is determined whether the recording is in-groove or on-groove recording by the method described in Embodiment 1. After this determination, the laser beam is moved to the control information region 104, tracking control is applied to the grooves, and control information is reproduced. Since the recording track information of the second, third, and fourth information recording layers 604, 606, and 608 is included in the control information, accurate tracking control is possible even without performing any identification of the other information recording layers by comparison of the difference signal and sum signal in the identification region.

In this embodiment, the thickness up to the first information recording layer was set at 100 µm, and the identification region and control information region were disposed in at least the first information recording layer, but the thickness up to the second information recording layer may be set at 100 µm, and the identification region and control information region disposed in this layer. For example, the thickness of the intermediate layers 607, 605, and 603, starting from the cover layer 609, may be set at 60/15/25/20 µm. In this case, since the fourth information recording layer is relatively thick (60 µm), the effect of dirt or scratches on the cover layer surface can be minimized when recording to or reproducing from the fourth information recording layer.

It should go without saying that the shape of the optical recording medium shown in Embodiments 1 to 3, and the specific numerical values given for track radial position, depth, groove width, and track pitch can be suitably changed according to the characteristics of the recording film and the performance of the recording and reproduction apparatus being used.

The method of the present invention for recording and reproduction with an optical recording medium is useful in large-capacity information recording apparatus because it allows information to be recorded and reproduced with good signal quality.

The invention claimed is:

1. A recording and reproduction apparatus that records and reproduces information by directing a laser beam at an optical recording medium having (i) spiral or concentric circular grooves for tracking a laser beam, (ii) an information recording layer, (iii) an identification region, and (iv) an information recording region, wherein a track pitch Tp2 of the circular grooves that are formed in the identification region is larger than a track pitch Tp1 of the circular grooves that are formed in the information recording region, and wherein a width of the circular grooves formed in the identification region is less than a width between the circular grooves, the recording and reproduction apparatus comprising:

an irradiation unit for directing the laser beam at the optical recording medium;

a light receiving unit for receiving the laser beam reflected by the information recording layer, the reflected laser beam being received by a photodetector that is split into two parts by a split line parallel to a direction of the circular grooves;

a control unit for determining whether the circular grooves on a side of the optical recording medium where the laser beam is incident are convex or concave based on sum signal and a difference signal of photodetection signals outputted from the photodetector, and for subjecting the circular grooves to tracking control based on a result of the determination of whether the circular grooves are convex or concave; and an objective lens arranged to make a spot diameter of the laser beam directed by the irradiation unit larger than the width of the circular grooves formed in the identification region and less than the width between the circular grooves formed in the identification region.

2. A method for recording and reproducing information by directing a laser beam at an optical recording medium having (i) spiral or concentric circular grooves for tracking a laser beam, (ii) an information recording layer, (iii) an identification region, and (iv) an information recording region, wherein a track pitch Tp2 of the circular grooves that are formed in the identification region is larger than a track pitch Tp1 of the circular grooves that are formed in the information recording region, and wherein a width of the circular grooves formed in the identification region is less than a width between the circular grooves, the method comprising:

directing the laser beam at the circular grooves formed in the identification region of the optical recording medium, such that a spot diameter of the laser beam directed at the circular grooves formed in the identification region is larger than the width of the circular grooves formed in the identification region and is less than the width between the circular grooves formed in the identification region;

directing the laser beam at the circular grooves formed in the information recording region of the optical recording medium;

controlling a focal point of the laser beam to focus on the information recording layer;

receiving the laser beam reflected by the information recording layer with a photodetector that is split into two parts by a split line parallel to a direction of the circular grooves;

determining whether the circular grooves on a side of the optical recording medium where the laser beam is incident are convex or concave based on a sum signal and a difference signal of photodetection signals outputted from the photodetector; and subjecting the circular grooves to tracking control based on a result of the determining of whether the circular grooves are convex or concave.

3. The method for recording and reproducing information according to claim 2, wherein the spot diameter of the laser beam that is directed at the information recording layer is larger than the width of the circular grooves formed in the identification region.

4. The method for recording and reproducing information according to claim 2, wherein the optical recording medium includes a plurality of the information recording layers and wherein the controlling of the focal point of the laser beam is performed on one information recording layer of the plurality of information recording layers.

5. The method for recording and reproducing information according to claim 4, further comprising determining whether the circular grooves of an information recording layer of the plurality of information recording layers that is not subjected to the controlling of the focal point of the laser beam are convex or concave based on recording track information stored in a control information region of the optical recording medium.

6. The method for recording and reproducing information according to claim 2, wherein information signals have not been recorded in the circular grooves formed in the identification region of the optical recording medium.

* * * * *

UNITED STATES PATENT AND TRADEMARK OFFICE
CERTIFICATE OF CORRECTION

| | |
|---|---|
| PATENT NO. | : 7,701,813 B2 |
| APPLICATION NO. | : 10/568595 |
| DATED | : April 20, 2010 |
| INVENTOR(S) | : Naoyasu Miyagawa |

It is certified that error appears in the above-identified patent and that said Letters Patent is hereby corrected as shown below:

ON THE COVER PAGE:
In section (54), the title: "METHOD FOR RECORDING TO AND REPRODUCING FROM AN OPTICAL RECORDING MEDIUM, OPTICAL RECORDING MEDIUM, AND RECORDING AND REPRODUCTION APPARATUS FOR THE SAME"

should read -- METHOD FOR RECORDING INFORMATION TO AND REPRODUCING INFORMATION FROM AN OPTICAL RECORDING MEDIUM BY ADJUSTING A SPOT DIAMETER OF A LASER BEAM, AND A RECORDING AND REPRODUCTION APPARATUS FOR THE SAME --

Signed and Sealed this

Seventeenth Day of August, 2010

David J. Kappos
*Director of the United States Patent and Trademark Office*

UNITED STATES PATENT AND TRADEMARK OFFICE
CERTIFICATE OF CORRECTION

PATENT NO. : 7,701,813 B2
APPLICATION NO. : 10/568595
DATED : April 20, 2010
INVENTOR(S) : Naoyasu Miyagawa It is certified that error appears in the above-identified patent and that said Letters Patent is hereby corrected as shown below:

ON THE COVER PAGE:
Item (54) and at Column 1, lines 1-6, the title: "METHOD FOR RECORDING TO AND REPRODUCING FROM AN OPTICAL RECORDING MEDIUM, OPTICAL RECORDING MEDIUM, AND RECORDING AND REPRODUCTION APPARATUS FOR THE SAME"

should read -- METHOD FOR RECORDING INFORMATION TO AND REPRODUCING INFORMATION FROM AN OPTICAL RECORDING MEDIUM BY ADJUSTING A SPOT DIAMETER OF A LASER BEAM, AND A RECORDING AND REPRODUCTION APPARATUS FOR THE SAME --

This certificate supersedes the Certificate of Correction issued August 17, 2010.

Signed and Sealed this

Fourteenth Day of September, 2010

David J. Kappos
*Director of the United States Patent and Trademark Office*